United States Patent Office 2,856,402
Patented Oct. 14, 1958

2,856,402
TREATMENT OF COTTON LINTERS

Harry W. Turner, Wilmington, Del., assignor to Hercules Powder Company, Wilmington, Del., a corporation of Delaware No Drawing. Application September 26, 1955
Serial No. 536,757

13 Claims. (Cl. 260—231)

This invention relates to a novel and improved process for producing cotton linters of decreased crystallinity, increased reactivity and improved physical properties, and to the product produced by the novel and improved process.

Cellulose, as it occurs in cotton linters, is considered to be composed of two phases. One of these is the dense crystalline phase giving rise to characteristic X-ray diffraction patterns and believed to consist of minute fibrous crystals, composed of many parallel cellulose molecules lying side by side and held together by forces known as hydrogen bonds. The crystals are not discrete but are considered to be connected by long cellulose molecules which, in proceeding from one end of the molecule to the other, may pass through a dozen or more crystallites and intercrystalline regions. There is, thus, produced a discontinuous crystalline structure held together by the interconnecting cellulose chains. The intercrystalline portions of the cellulose molecules constitute a continuous network, and thus represent the less dense, so-called, amorphous modification or phase. Unlike the crystalline fraction, the amorphous phase gives rise to a broad halo when irradiated in the X-ray beam.

It has been recognized that purified cotton linters have a relatively high level of crystallinity. This physical characteristic is generally considered to give rise to a reduced chemical reactivity; and, in conjunction with fiber morphology, may be responsible for the inability of cotton linters to be converted into paper of high strength under normal refining conditions. Consequently, considerable effort has been directed toward the production of purified cotton linters of decreased crystallinity and modified morphology to improve both chemical reactivity and papermaking properties.

Lint cotton is usually received at the purification mills in bales. The bales are opened at the mills and the cotton linters are mechanically purified in order to remove physically entrained impurities. At this stage in the purification the raw linters may have a crystallinity quite similar to that of wood pulp. However, the raw cotton linters must be subjected to chemical purification procedures in order to produce a product suitable for use in papermaking and in the production of cellulose derivatives such as cellulose acetate, sodium carboxymethylcellulose, ethyl cellulose, and the like. The chemical operations involved in the purification of raw linters are pressure digestion in alkaline liquors and bleaching usually with chlorine or a hypochlorite. The exact conditions employed may vary because of the impurities which must be removed and because of the physical form of the raw linters. The purification steps are primarily designed to remove wax, pectins and small amounts of coloring matter distributed in or on the fibers, and at the same time to destroy almost completely the contaminants which are physically dispersed in but separate from the linters. In addition, the purification steps regulate the viscosity of the linters.

Although the chemical purification of the cotton linters is essential to the production of a high quality product, it has been observed that during such purification, and particularly during the digestion in caustic alkali, the crystallinity of the cotton linters is markedly increased.

In accordance with this invention, it has been found that in the chemical purification of cotton linters the increase in crystallinity that normally occurs during purification can be inhibited or substantially completely prevented by adding ether substituents to the anhydroglucose units in an amount such that the chemically modified cotton linters remain alkali insoluble and water insoluble and retain the fibrous form of the raw or unmodified cotton linters. The chemical modification of the cotton linters is made at a time prior to any substantial increase in the crystallinity of the cotton linters in the chemical purification procedure.

The advantages and desirability of practicing this invention are shown by the examples that follow.

EXAMPLE 1

In a series of runs the crystallinity of various samples was determined from X-ray diffraction patterns. Samples were obtained from (1) raw second-cut mechanically purified cotton linters prior to chemical purification, (2) second-cut mechanically purified cotton linters after steeping in aqueous caustic, pressure digestion in aqueous caustic and conventional bleaching with chlorine, and (3) wood pulp having satisfactory papermaking properties and chemical reactivity. Additionally, crystallinities were determined on several samples of cotton linters chemically modified in accordance with this invention. These chemical cotton samples were prepared by steeping raw second-cut mechanically purified cotton linters in aqueous caustic, reacting with ethylene oxide to add hydroxyethyl substituent in various degrees of substitution, digesting in aqueous caustic, bleaching with chlorine, washing and drying. The crystallinities of the various samples are shown in Table I. In this example and subsequent examples, D. S. refers to degree of substitution.

Table I

| Sample | D. S. | Crystallinity (percent) |
|---|---|---|
| Wood pulp | | 53 |
| Raw linters | | 54 |
| Chemically purified linters | | 65 |
| Chemically modified and purified linters | 0.017 | 58 |
| | 0.054 | 60 |
| | 0.19 | 58 |
| | 0.23 | 54 |
| | 0.25 | 53 |

These data demonstrate that the practice of this invention results in a product of substantially lower crystallinity than the cotton linters produced by conventional, mechanical and chemical purification procedures.

EXAMPLE 2

The advantages of this invention are apparent from the following data showing the effect this invention has on the paper making properties of cotton linters. In runs 1 and 2 raw second-cut mechanically purified cotton linters were steeped in aqueous caustic, reacted with ethylene oxide to produce a low D. S. hydroxyethylated cotton linters (shown as HEC), digested in aqueous caustic, chlorine bleached, washed and dried. In runs 3 and 4 second-cut mechanically purified cotton linters were digested in aqueous caustic, chlorine bleached, washed and dried, and the resulting chemically purified cotton linters were then reacted with ethylene oxide to produce a low D. S. hydroxyethylated product (shown as HEC). The products from all runs were refined at a 2.5% consistency (neutral pH) in a 1¼ lb. Valley beater with a 6 kg. bedplate load. The refined samples were handsheeted using Noble and Wood handsheeting equipment to a 40 lb. basis weight (24×36—500) and the handsheets were then conditioned and tested by standard TAPPI procedures (Technical Association of the Pulp and Paper Industry). The tests demonstrated the strength of the sheets as represented by Mullen burst, Elmendorf tear, tensile strength and fold endurance.

Table II

| Run | 1 | 2 | 3 | 4 |
|---|---|---|---|---|
| Paper Furnish | HEC | HEC | HEC | HEC |
| D.S. | 0.11 | 0.20 | 0.09 | 0.20 |
| Crystallinity, percent | | 58 | | 62 |
| Mullen burst, lb./sq. in | 36.4 | 43.5 | 29.8 | 34.6 |
| Elmendorf tear, g./sheet | 104 | 88 | 74 | 54 |
| MIT folds, double | 1,210 | 2,945 | 431 | 597 |
| Tensile, lb./in | | 19.0 | | 16.7 |
| Beating time, hr | 2.5 | 2.0 | 2.5 | 2.0 |

EXAMPLE 3

The data in this example were obtained in the manner described in Example 2 except propylene oxide was used for chemical modification and the paper furnish is shown as HPC to indicate hydroxypropylation of the furnish. In run 1, raw second-cut mechanically purified cotton linters were chemically modified, and in run 2 the cotton linters had been mechanically and chemically purified before modification.

Table III

| Run | 1 | 2 |
|---|---|---|
| Paper furnish | HPC | HPC |
| D.S. | 0.05 | 0.03 |
| Crystallinity, percent | 54 | 60 |
| Mullen burst, lb./sq. in | 36.5 | 31.4 |
| Elmendorf tear, g./sheet | 93 | 68 |
| MIT folds, double | 1,010 | 208 |
| Beating time, hr | 2.5 | 2.5 |

EXAMPLE 4

The example is similar to Example 2 except butylene oxide was used to produce a hydroxybutylated furnish (shown as HBC). In run 1 raw second-cut mechanically purified cotton linters were chemically modified and in run 2 the cotton linters were mechanically and chemically purified before modification.

Table IV

| Run | 1 | 2 |
|---|---|---|
| Paper furnish | HBC | HBC |
| D.S. | 0.01 | 0.03 |
| Crystallinity, percent | 57 | 62 |
| Mullen burst, lb./sq. in | 32.4 | 25.0 |
| Elmendorf tear, g./sheet | 82 | 68 |
| MIT folds, double | 327 | 59 |
| Tensile, lb./in | 18.7 | 13.2 |
| Beating time, hr | 2.5 | 2.5 |

EXAMPLE 5

The example is similar to Example 2 except the cotton linters were modified by carboxyethylation (furnish shown as CEC) using acrylonitrile with subsequent reaction in aqueous caustic. In run 1 the chemical modification was effected before chemical purification and in run 2 the chemical modification was subsequent to chemical purification.

Table V

| Run | 1 | 2 |
|---|---|---|
| Paper furnish | CEC | CEC |
| D.S. | 0.01 | 0.01 |
| Mullen burst, lb./sq. in | 36.3 | 28.8 |
| Elmendorf tear, g./sheet | 76 | 73 |
| MIT folds, double | 1,200 | 64 |
| Beating time, hr | 2.5 | 2.5 |

EXAMPLE 6

The example is similar to Example 2 except the samples of cotton linters were carboxymethylated with monochloracetic acid in the presence of aqueous caustic. The product is shown as NaCMC. In run 1 the chemical modification was effected before chemical purification of the linters and in run 2 the chemical modification was subsequent to chemical purification.

Table VI

| Run | 1 | 2 |
|---|---|---|
| Paper furnish | NaCMC | NaCMC |
| D.S. | 0.02 | 0.02 |
| Mullen burst, lb./sq. in | 28.6 | 26.9 |
| Elmendorf tear, g./sheet | 100 | 73 |
| MIT folds, double | 232 | 85 |
| Tensile, lb./hr | 15.4 | 15.0 |
| Beating time, hr | 2.5 | 2.5 |

EXAMPLE 7

The importance of this invention can also be realized by comparing the results obtained when chemically modified cotton linters are employed in an acetylation procedure with the results obtained when conventionally purified cotton linters are used in the same procedure. In run 1 mechanically and chemically purified cotton linters, considered to be a good acetylation grade of chemical cotton, were acetylated to the triacetate form and solutions of the triacetate were examined. In run 2 the chemical cotton was replaced by chemically modified cotton linters, prepared in accordance with this invention, by the hydroxyethylation with ethylene oxide of mechanically purified cotton linters prior to chemical purification.

In preparing the triacetate of the various samples, a fibrous acetylation procedure was used. In this procedure 50 grams of each air-dried sample was steeped for 5 hours in 750 ml. of glacial acetic acid. An acetylation mixture was prepared by mixing 650 ml. of benzene and 300 ml. of acetic anhydride and cooling to 0° C. This mixture was added to a vessel containing 1.25 g. of $H_2SO_4$ (96%). After the acetylation mixture had been stirred, the steeped sample was added to the vessel and the temperature was held at 0° C. for 30 minutes. The acetylation reaction then took place as the vessel was tumbled for 17 hours at 30° C. The fibrous triacetate was filtered, washed with benzene, then with methanol and finally with distilled water. The triacetate was stabilized by boiling in distilled water in two 1-hour boils, and, after centrifuging, the triacetate was dried at 105° C.

Solutions of 15% by weight of the triacetates were prepared in an 85:15 methylene chloride:ethyl alcohol mixture, and the beadfall viscosity, birefringence and filterability of the solutions were determined. The filterability of the solutions was measured by the volume (ml.) of solution passing through a given filter pad under a given pressure until flow of solution ceased. Thus, the higher the volume the better the filterability. The results of these determinations are tabulated below.

Table VII

| Run | D.S. | Beadfall Viscosity (Sec.) | Birefringence | Filterability (ml.) |
|---|---|---|---|---|
| 1 | | 45-60 | 23-30 | 66-94 |
| 2 | 0.16 | 81 | 12 | 236 |

In run 1 a series of samples was used, and the properties of the various samples were within the ranges indicated in Table VII.

The advantages of this invention are realized by chemically modifying cotton linters in a manner such that ether substituents, preferably of hydrophilic or polar type, are introduced to the anhydroglucose units. Among the substituents that are introduced to the cellulose are the carboxyalkyl radicals, such as carboxymethyl, carboxyethyl, and the like, either in the free acid form or in the form of an alkali metal salt; the hydroxyalkyl radicals; the sulfoalkyl radicals, such as sulfoethyl, and the like, either in the acid form or in the form of an alkali metal salt; and the cyanoalkyl radicals, such as cyanoethyl, and the like.

The hydroxyalkyl substituents that can be added to the cotton linters for chemical modification, in accordance with this invention, are hydroxyethyl, hydroxypropyl, hydroxybutyl and similar radicals, as well as mixed hydroxyalkyl radicals, for example hydroxyethyl, hydroxypropyl and the like. The preferred substituent for the practice of this invention is the hydroxyethyl substituent, and the details of this invention will be described hereinbelow in greater particularity with reference to the introduction of hydroxyethyl substituent to the cotton linters.

The amount of hydroxyethyl or similar hydroxyalkyl radical or substituent that is added to the cotton linters is such that the linters remain alkali-insoluble and water-insoluble. The linters also retain their fibrous form after treatment in accordance with the invention. Retention of alkali insolubility is necessary since the linters, after addition of hydroxyethyl substituent, will usually be subjected to a digestion treatment at elevated temperature and pressure in the presence of aqueous caustic. The treated linters must be substantially alkali insoluble in order to prevent dissolution in the aqueous caustic during digestion. The alkali insolubility and water insolubility properties are dependent upon the degree of substitution that occurs in the practice of this invention and the degree of substitution at which the treated cotton linters become alkali soluble or water soluble, depend to a large extent upon the manner in which the hydroxyethyl substituent is added to the cotton linters, and upon the uniformity of substitution that occurs. It has been found that it is preferable to impart a degree of substitution not substantially greater than 0.5 when hydroxyethyl substituent is added to the cotton linters.

Prior to treatment in accordance with this invention, the cotton linters as received in the bleaching plant are usually subjected to mechanical cleaning operations which are intended to remove contaminants from the cotton linters. Such operations can involve the use of centrifugal action on a water slurry of the cotton linters. The operations may also involve beating, screening and similar types of treatment to clean dry linters.

After mechanical cleaning, the cotton linters are usually subjected to a wetting or presteeping step in aqueous caustic having a concentration within the range of about 2–10% by weight. The purpose of the presteep or wetting step is to obtain uniformity of distribution of the caustic throughout the cotton linters. The presteeping step will usually be effected at atmospheric temperatures and pressures, and an excess of aqueous caustic is generally desirable. After removal of excess alkali liquor, the wetted cotton linters are introduced to a digester where the cotton linters are treated with aqueous caustic having a concentration of about 1.5% to 4.5% by weight. Digestion factors or conditions such as time, temperature and concentration of the alkali must be suitably adjusted to obtain the desired degree of cellulose purification and the desired level of viscosity in the purified linters. The conditions necessary to obtain these properties in the final product are well known and they are employed in the practice of this invention. During the digestion, wetting agents can be used in small amounts in the digestion liquor to aid in removing impurities from the cotton linters. The digestion can be carried out in a continuous operation in suitable equipment at temperatures as high as 185° C. and with treatment times as low as ten minutes. If desired, batch digestion can be used either in vertical stationary digesters or in rotating or tumbling digesters. In batch digestion the temperatures can vary from 135 to 170° C. for a period of time within the range of 2–6 hours. In both continuous and batch digestion it is usually desirable to employ superatmospheric pressures.

In the practice of this invention, the cotton linters are chemically modified at a point in the purification procedure prior to any substantial increase in the crystallinity of the cotton linters. For example, in order to introduce hydroxyethyl substituent to the cotton linters the linters can be treated with ethylene oxide during the presteeping step, usually after removal of any excess steeping liquor. Since the presteep is carried out with aqueous caustic, there is sufficient alkali present to catalyze reaction between cotton linters and ethylene oxide for addition of hydroxyethyl substituent. On the other hand, when continuous digestion of the cotton linters is used, the ethylene oxide can be reacted with the cotton linters during the initial stages of the digestion treatment. It must be understood, of course, that during the digestion the crystallinity of the cotton linters will ordinarily increase, and in such an operation the treatment with ethylene oxide must be carried out in the continuous digester prior to a substantial increase in crystallinity, for example, in the first one or two tubes of an 8 to 10 tube continuous digester. Alternatively, the cotton linters can be treated with ethylene oxide in a separate step between the presteeping operation and the digestion of the cotton linters.

Since the cotton linters can be treated with ethylene oxide during the presteeping step or during the digestion operation, it will be understood that in the practice of this invention the hydroxyethyl substituent can be added to the cotton linters at atmospheric temperatures and pressures, or if desired, the chemical modification of the cotton linters can be effected at somewhat elevated temperatures and pressures. The important requirement is that sufficient hydroxyethyl substituent be added to the cotton linters to inhibit substantial increases in crystallinity of the cotton linters during the digestion operation.

As a result of the digestion step, the chemically modified cotton linters of improved crystallinity have been freed from contaminants but they still retain a tan color and generally require bleaching treatments. The bleaching operations that can be used are similar to those now known and being practiced conventionally for removing color contaminants from cotton linters. Such bleaching agents as chlorine, hypochlorite, chlorine dioxide, peroxide, permanganate and similar oxidizing agents can be used. The time, temperature, pH, concentration of bleach and other conditions are well known and a detailed discussion of such conditions is not essential to an understanding of this invention. The bleaching operation can be carried out in a single stage or multi-stage operation with intermittent washing and filtering steps used for removal of black liquid. Upon completion of the bleaching operation, the bleached linters are washed for removing further amounts of black liquor, and the thus-treated linters are then dried.

The product of this invention can be used in procedures where improved strength properties in cotton linters are desirable. Such properties are required in the papermaking art. Also, the product of this invention can be used in procedures where improved reactivity in cotton linters is desired, such as in acetylation, ethylation, carboxymethylation, and hydroxyethylation procedures for preparing cellulose derivatives from cotton linters. For example, the products of this invention can be used to make acetylated hydroxyethyl cellulose, carboxymethyl hydroxyethyl cellulose, ethyl hydroxyethyl, water soluble hydroxyethyl cellulose, and the like.

What I claim and desire to protect by Letters Patent is:

1. In the method for purifying raw cotton linters wherein said raw cotton linters are digested with aqueous caustic at an elevated temperature and pressure, the improvement which comprises chemically modifying said raw cotton linters by adding hydrophilic ether substituent to the anhydroglucose units at least prior to the second half of said digestion and thereby preventing any substantial increase in the crystallinity of said raw cotton linters, the resulting chemically modified cotton linters being alkali-insoluble and water-insoluble and retaining the fibrous structure of the unmodified raw cotton linters.

2. In the method for purifying raw cotton linters wherein said raw cotton linters are digested with aqueous caustic at an elevated temperature and pressure, the improvement which comprises chemically modifying said raw cotton linters by adding hydroxyalkyl substituent to the anhydroglucose units at least prior to the second half of said digestion and thereby preventing any substantial increase in the crystallinity of said raw cotton linters, the resulting chemically modified cotton linters being alkali-insoluble and water-insoluble and retaining the fibrous structure of the unmodified raw cotton linters.

3. The method according to claim 2 wherein the hydroxyalkyl substituent is hydroxyethyl.

4. The method according to claim 2 wherein the hydroxyalkyl substituent is hydroxypropyl.

5. The method according to claim 2 wherein the hydroxyalkyl substituent is hydroxybutyl.

6. In the method for purifying raw cotton linters wherein said raw cotton linters are digested with aqueous caustic at an elevated temperature and pressure, the improvement which comprises chemically modifying said raw cotton linters by adding carboxyalkyl substituent to the anhydroglucose units at least prior to the second half of said digestion and thereby preventing any substantial increase in the crystallinity of said raw cotton linters, the resulting chemically modified cotton linters being alkali-insoluble and water-insoluble and retaining the fibrous structure of the unmodified raw cotton linters.

7. The method according to claim 6 wherein the carboxyalkyl substituent is carboxymethyl.

8. The method according to claim 6 wherein the carboxyalkyl substituent is carboxyethyl.

9. The improved method for purifying raw cotton linters and for permanently inhibiting increase in the crystallinity of said linters during said purification which comprises steeping mechanically purified raw cotton linters in aqueous caustic, reacting said raw linters wet with aqueous caustic with ethylene oxide to add hydroxyethyl substituent to the anhydroglucose units, and digesting said modified cotton linters in aqueous caustic at an elevated temperature and pressure, the resulting modified cotton linters being alkali-insoluble and water-insoluble and retaining the fibrous structure of the unmodified raw cotton linters.

10. The improved method for purifying raw cotton linters and for permanently inhibiting increase in the crystallinity of said linters during said purification which comprises steeping mechanically purified raw cotton linters in aqueous caustic, digesting said raw linters wet with aqueous caustic at an elevated temperature and pressure, reacting said linters with ethylene oxide to add hydroxyethyl substituent to the anhydroglucose units during the first half of said digestion, the resulting modified cotton linters being alkali-insoluble and water-insoluble and retaining the fibrous structure of the unmodified raw cotton linters.

11. As a new composition of matter, a purified, chemically modified alkali-insoluble and water-insoluble fibrous cotton linters of substantially increased reactivity, permanently and substantially reduced crystallinity, and further characterized by imparting markedly increased strength properties to paper produced therefrom, said linters having been digested with aqueous caustic at an elevated temperature and pressure and chemically modified by addition of hydrophilic ether substituent to the anhydroglucose units at least prior to the second half of said digestion.

12. As a new composition of matter, a purified, chemically modified alkali-insoluble and water-insoluble fibrous cotton linters of substantially increased reactivity, permanently and substantially reduced crystallinity, and further characterized by imparting markedly increased strength properties to paper produced therefrom, said linters having been digested with aqueous caustic at an elevated temperature and pressure and chemically modified by addition of hydroxyalkyl substituent to the anhydroglucose units at least prior to the second half of said digestion.

13. As a new composition of matter, a purified, chemically modified alkali-insoluble and water-insoluble fibrous cotton linters of substantially increased reactivity, permanently and substantially reduced crystallinity, and further characterized by imparting markedly increased strength properties to paper produced therefrom, said linters having been digested with aqueous caustic at an elevated temperature and pressure and chemically modified by addition of carboxyalkyl substituent to the anhydroglucose units at least prior to the second half of said digestion.

References Cited in the file of this patent

UNITED STATES PATENTS

| | | |
|---|---|---|
| 1,863,208 | Schorger | June 14, 1932 |
| 1,923,641 | Richter | Aug. 22, 1933 |
| 2,036,257 | Craik | Apr. 7, 1936 |
| 2,236,544 | Maxwell | Apr. 1, 1941 |
| 2,388,764 | Reichel | Nov. 13, 1945 |
| 2,667,481 | Tasker | Jan. 26, 1954 |
| 2,687,411 | Higgins | Aug. 24, 1954 |

FOREIGN PATENTS

| | | |
|---|---|---|
| 368,271 | Great Britain | Feb. 29, 1932 |